US006946972B2

(12) United States Patent
Mueller et al.

(10) Patent No.: US 6,946,972 B2
(45) Date of Patent: Sep. 20, 2005

(54) SYSTEMS AND METHODS FOR WIRELESSLY TRANSMITTING DATA FROM A UTILITY METER

(75) Inventors: Wilfred Mueller, Calgary (CA); Roderick Michael Johnson, Scottsdale, AZ (US); Dane Blackwell, Calgary (CA); Patrick C. Hamilton, Calgary (CA); Dennis M. Needham, Calgary (CA); Allan L. Scribner, Calgary (CA)

(73) Assignee: SmartSynch, Inc., Jackson, MS (US)

( * ) Notice: Subject to any disclaimer, the term of this patent is extended or adjusted under 35 U.S.C. 154(b) by 745 days.

(21) Appl. No.: 10/056,970

(22) Filed: Jan. 25, 2002

(65) Prior Publication Data

US 2002/0145537 A1 Oct. 10, 2002

Related U.S. Application Data

(60) Provisional application No. 60/263,768, filed on Jan. 25, 2001.

(51) Int. Cl.[7] .............................................. C08B 23/00
(52) U.S. Cl. .................... 340/870.02; 702/62; 455/425; 340/870.03; 340/870.05
(58) Field of Search ....................... 340/870.02, 870.03, 340/870.11, 870.12, 870.05; 455/428; 702/62

(56) References Cited

U.S. PATENT DOCUMENTS 4,862,493 A 8/1989 Venkataraman et al.
5,056,107 A 10/1991 Johnson et al.
5,301,122 A 4/1994 Halpern (Continued)

FOREIGN PATENT DOCUMENTS

WO     WO 99/30300     6/1999

OTHER PUBLICATIONS

Mark–V Series Energy Meter with Built–in Digital PCS Cellular Phone, Product Release, Date unknown, TransData, Inc., P.O. Box 832919, Richardson, TX 75083 (www.trandatainc.com).

Mark–V Solid State Energy Meter, Product Release, Date unknown, TransData, Inc., P.O. Box 832919, Richardson, TX 75083 (www.transdatainc.com).

(Continued)

*Primary Examiner*—Albert K. Wong
(74) *Attorney, Agent, or Firm*—Morris, Manning & Martin (57) ABSTRACT

A method for wirelessly transmitting data from an utility meter, such as an electric meter, is disclosed. A microprocessor housed inside an energy meter obtains readings of various power indicia, stores the readings, processes the buffer to determine an efficient means of formatting the data for transmission using a radio frequency communications link. The method examines the plurality of readings and determines if values can be communicated by transmitting an initial reading and followed by the difference of the next reading from the previous reading. A special indication is transmitted to turn 'on' compression and allow the receiver to properly interpret received data. Other indicators are transmitted to turn 'off' compression, turn on compression for a pre-defined limited duration, or vary the range of the difference between readings.

8 Claims, 4 Drawing Sheets

U.S. PATENT DOCUMENTS

| | | | |
|---|---|---|---|
| 5,315,235 | A | 5/1994 | Atherton et al. |
| 5,459,459 | A | 10/1995 | Lee, Jr. |
| 5,469,049 | A | 11/1995 | Briese et al. |
| 5,525,898 | A | 6/1996 | Lee, Jr. et al. |
| 5,537,333 | A | 7/1996 | Hemminger et al. |
| 5,553,094 | A | 9/1996 | Johnson et al. |
| 5,555,508 | A | 9/1996 | Munday et al. |
| 5,565,783 | A | 10/1996 | Lau et al. |
| 5,621,629 | A | 4/1997 | Hemminger et al. |
| 5,627,759 | A | 5/1997 | Bearden et al. |
| 5,684,472 | A | 11/1997 | Bane |
| 5,748,104 | A | 5/1998 | Argyroudis et al. |
| 5,818,725 | A | 10/1998 | McNamara et al. |
| 5,883,886 | A | 3/1999 | Eaton et al. |
| 5,897,607 | A | 4/1999 | Jenney et al. |
| 5,912,633 | A | 6/1999 | Allison et al. |
| 5,923,269 | A | 7/1999 | Shuey et al. |
| 5,924,051 | A | 7/1999 | Provost et al. |
| 5,933,004 | A | 8/1999 | Jackson et al. |
| 5,943,246 | A | 8/1999 | Porter |
| 5,963,146 | A | 10/1999 | Johnson et al. |
| 5,963,734 | A | 10/1999 | Ackerman et al. |
| 5,995,022 | A * | 11/1999 | Plis et al. .............. 340/870.02 |
| 6,005,759 | A | 12/1999 | Hart et al. |
| 6,043,642 | A | 3/2000 | Martin et al. |
| 6,073,169 | A | 6/2000 | Shuey et al. |
| 6,081,204 | A | 6/2000 | Lavoie et al. |
| 6,088,659 | A | 7/2000 | Kelley et al. |
| 6,094,622 | A | 7/2000 | Hubbard et al. |
| 6,100,817 | A | 8/2000 | Mason, Jr. et al. |
| 6,112,159 | A | 8/2000 | Bond et al. |
| 6,115,676 | A | 9/2000 | Rector et al. |
| 6,118,676 | A | 9/2000 | Divan et al. |
| 6,128,584 | A | 10/2000 | Hemminger et al. |
| 6,131,027 | A | 10/2000 | Armbruster et al. |
| 6,133,850 | A | 10/2000 | Moore |
| 6,137,423 | A | 10/2000 | Glorioso et al. |
| 6,172,616 | B1 | 1/2001 | Johnson et al. |

OTHER PUBLICATIONS

TransData Web Site Printout, www. Transdatainc.com/meters.html. Dated Sep. 2, 2001.

TransData Web Site Printout, www. Transdatainc.com, Dated Dec. 2, 2001.

Mark–V Energy Meter with Digital PCS Cellular Modem, Product Release, Date unknown, TransData, Inc., P.O. Box 832919, Richarson, TX 75083 (www.transdatainc.com).

Web Site Printout, www.electricnet.com/ecommcenters/transdata.html. Dated Sep. 2, 2001.

Press Release, "Generation [] Platform", SmartSynch, Inc., Fax Dated Nov. 15, 2000.

Press Release, "Siemens and XP Technology Introduce Wireless System That Sets Standard for C&I Electric Metering Applications," Siemens Web Site Printout, www.charlotte.sc.siemens.com/Ne . . . Press/PressReleases/SEA_000328.html, Mar. 8, 2000.

Press Release, "SmartSynch and Siemens to Showcase Wireless Smart Meters with Power Quality and Reliability Features At AMRA", Yahoo Finance Web Site Printout, http://biz.yahoo.combw/000920/ms_smartsy.html, dated Sep. 20, 2000.

Smart Meters and Power Monitoring at Florida Power & Light, draft presentation dated Jun. 26, 2000 to Automated Meter Reading Association 2000 Show at Tampa, Florida, Sep., 25–28, 2000.

Siemens Website printout, "S4 Meters", www.siemenstd.com/prods/meters/prods/s4.html, printout dated Nov. 10, 2000.

* cited by examiner

SYSTEMS AND METHODS FOR WIRELESSLY TRANSMITTING DATA FROM A UTILITY METER

CROSS REFERENCE TO RELATED APPLICATIONS

This application claims the benefit of U.S. Provisional Application No. 60/263,768, filed on Jan. 25, 2001, which is incorporated herein by reference.

FIELD OF THE INVENTION

The present invention relates generally to electronic utility meters, and more particularly to a method of wirelessly transmitting meter reading data from a utility meter, such as an electric meter, to a central host computer for recording and reporting meter readings. Readings may include scheduled events, such as periodic usage data, or unscheduled events, such as service interruptions.

BACKGROUND OF THE INVENTION

Conventional commercial and industrial electronic meters, such as the meter described in U.S. Pat. No. 6,112,159 ("the Siemens S4"), the meter described in U.S. Pat. No. 6,081,204, and the meter described in U.S. Pat. No. 6,094,622, which are all incorporated by reference herein, are primarily designed for reading via an optical port. Although collection of meter data by wired and wireless networks has been proposed and such meters generally include ports for connectors other than the optical port that could be used by automated meter reading ("AMR") systems, the widespread development of AMR systems has been uneconomic due to either high equipment costs or significant usage costs when compared to the generally low value of meter readings. One such cost is associated with transfer of data using wireless carrier services, such as paging service providers. In such cases, reduction of the airtime required to send data or reduction of the amount of data transmitted can result in significant cost reductions. Therefor, there is a need for a lower-cost method for collecting meter readings over wireless wide-area networks, such as pager networks.

SUMMARY OF THE INVENTION

The present invention is generally directed to a method for wirelessly transmitting data from an utility meter, such as an electric meter. A microprocessor housed inside an energy meter obtains readings of various power indicia, stores the readings, processes the buffer to determine an efficient means of formatting the data for transmission using a radio frequency communications link. The method examines the plurality of readings and determines if values can be communicated by transmitting an initial reading and followed by the difference of the next reading from the previous reading. A special indicator is transmitted to turn 'on' compression and allow the receiver to propertly interpret received data. Other indicators are transmitted to turn 'off' compression, turn on compression for a pre-defined limited duration, or vary the range of the difference between readings. In one aspect of the invention, an interface board is provided for connecting an electrical power usage meter to a pager board capable of transmitting data to a remote host computer. The interface board includes an input port for connection to the meter for periodically reading load profile data from the meter; and an output port for connection to the pager board for outputting load profile data to the pager board. The load profile data may be transmitted via the pager board and a pager system to a remote host computer. A compact, efficient differential compression method is provided in the interface board to reduce the airtime cost of transmission of load profile data.

In one embodiment of the invention, if the relative difference of sequential meter reading values to be transmitted is less than the predetermined value and the compression flag is set, then the microprocessor transmits the relative difference. If the the relative difference is greater than the predetermined value, and the compression flag is not set, then the microprocesser transmits the meter reading data. If the relative difference is greater than the predetermined value, and the compression flag is set, then the microprocessor resets the compression flag, transmits a decompression indication, and transmits the meter reading data.

In another embodiment of the invention, the microprocessor uses a limited compression indicator when a third meter reading value in the buffer is examined and a second relative difference between the third meter reading value and the second meter reading value is determined, and the second relative difference is less than the predetermined amount.

In yet another embodiment of the invention, the microprocessor determines whether the relative difference is less than a second predetermined value, a third predetermined value, and a forth predetermined value, and transmits a corresponding difference magnitude indicator with the compression indicator.

In yet another embodiment of the invention, a utility meter sends periodic power monitoring values to a host computer using the above described compression methods.

DETAILED DESCRIPTION OF INVENTION

Overview

One preferred embodiment of the invention is an interface board that may be used to convert a conventional electronic commercial and industrial meter such as a Siemens S4 meter to wireless operation. Meters such as the Siemens S4 comprise an enclosure, the front and sides of which are a glass cover, a base to which the glass cover is attached, and a meter board that includes an analog to digital converter, a digital signal processor, a micro-controller, and a power supply. For examples of such meters, see FIG. 1 of U.S. Pat. Nos. 6,094,622 and 6,081,204 which are incorporated herein by reference. The meter board also contains at least one functional component, generally an optical port, for communication with the outside world, and may include other ports or connectors. The Siemens S4 meter, for example, provides a serial port in addition to the optical port from which the inventors realized that it is possible to extract the same information that is available from the optical port.

While the exemplary interface board to be described below has been designed for use with a meter, such as the Siemens S4, that has a serial port that provides the same data as the optical port, it is within the ability of those skilled in the art to modify the design of the interface board so that it may be connected directly into the circuitry of the meter board, such as to a bus to which a digital signal processor or a micro-controller is connected, so that the interface board may obtain data without use of a low speed serial port. For example, the interface board may be modified so that it can be connected to the optional connector 38 shown in FIG. 1 of U.S. Pat. No. 6,094,622.

Hardware

Figure 1:
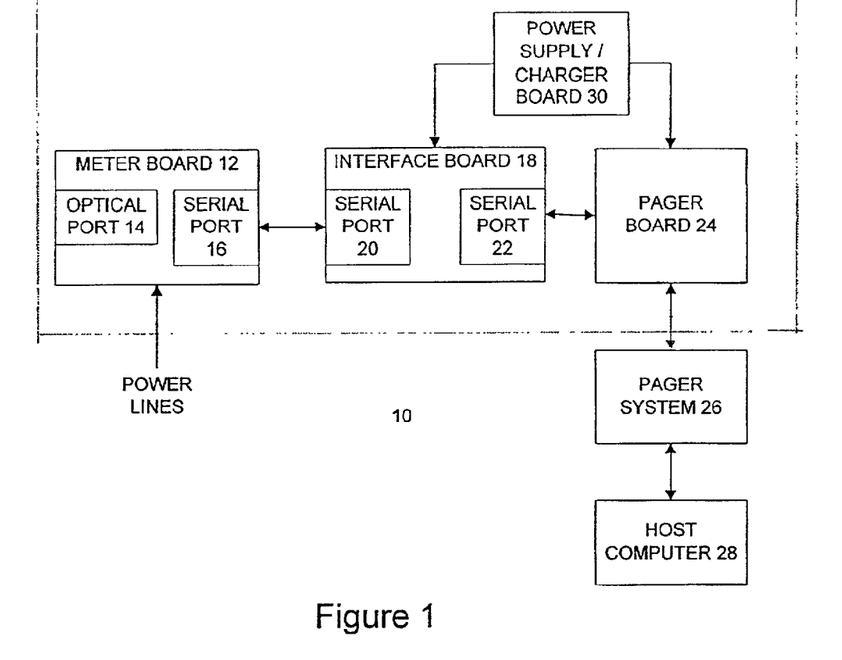
FIG. 1 is a block diagram of an exemplary electronic energy meter reading system in accordance with an embodiment of the present invention.

FIG. 1 shows, in an overall block diagram, a meter reading system 10 that includes a meter board 12 having an optical port 14 and a serial input/output port 16, an interface board 18 having a first serial port 20 connected to the serial input/output port 16 of the meter board 12 and a second serial input/output port 22, a fixed two-way wireless pager board 24 connected to the second serial input/output port 22, a pager system 26 such as the SkyTel System, and a remote host computer 28. Generally, the interface board 18 obtains electrical usage data from the meter board 12 and packages it in an appropriate form for transmission to a remote host computer 28 via the pager board 24 and the pager system 26. To reduce airtime cost the interface board 14 compresses the electrical usage data using a differential compression method to be described below. The interface board 18 also provides a capability for monitoring power quality that may be turned on and off from the remote host computer 28. If power quality monitoring is turned on, the interface board 18 obtains data including average phase voltages and angles from the meter board 12 using commands sent to the meter serial input/output port 16 and notifies the remote host computer 28 whenever certain criteria indicating a change in power quality to be described below are met.

In an exemplary embodiment described here, the pager board 24 is a Motorola 2-Way ReFlex 50TM Pager Board and the meter board 12 is an unmodified meter board of a Siemens S4 meter. The interface board 18 is installed together with the meter board 12 and the pager board 24 in a Siemens S4 meter enclosure (not shown). The interface board 18 is designed to fit inside the S4 meter enclosure with the meter board 12, the pager board 24, and a power supply and battery charger board 30 so that the resulting combination is entirely within the enclosure of the unmodified Siemens S4 meter enclosure. In FIG. 1, the boundary of the enclosure of the Siemens S4 meter is generally indicated by dashed line 11.

Figure 2:
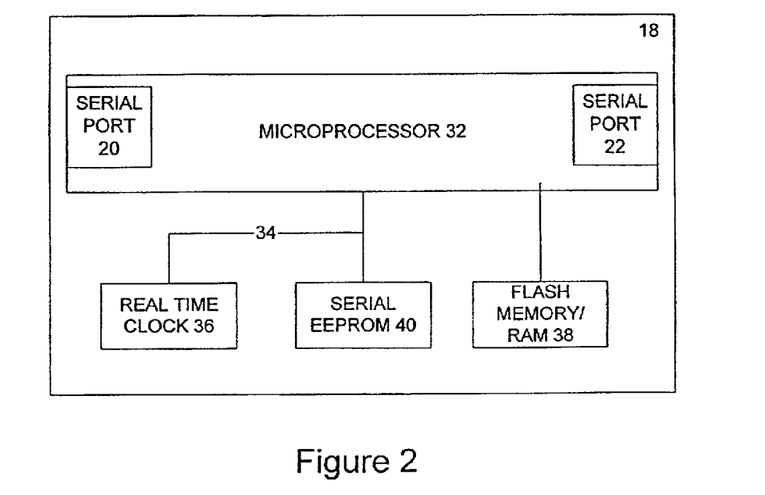
FIG. 2 is a block diagram of an interface board in accordance with an embodiment of the present invention for use in an electronic energy meter system such as that shown in FIG. 1.

The interface board 18 is built on a conventional printed circuit board designed to fit within the S4 meter enclosure from hardware components that are commercially available. A block diagram of the interface board 18 is shown in FIG. 2. The interface board 18 includes a Microchip PIC 17C756-16/IL microprocessor 32, which provides the first serial input/output port 20 for connection to the meter serial input/output port 16 and the second serial input/output port 22 for connection to the pager board 24. Also connected to the microprocessor 32 by an Inter-Integrated Circuit ("I²-C") bus 34 are a real time clock 36 and a serial electrically-erasable read-only memory ("EEPROM") 40. The microprocessor 32 also contains internal EEPROM (not shown) and is provided with external RAM and flash memory, indicated in FIG. 2 by reference numeral 38. The necessary address decoding circuitry (not shown) to allow the microprocessor 32 to access the external RAM and flash memory 38 is provided on the interface board 18.

Instructions for execution by the microprocessor 32 are stored mainly in the flash memory portion of the external RAM and flash memory 38, except for test software, boot loader software, and reset algorithms, which are stored in the internal EEPROM within the microprocessor 32. Programmable and configurable parameters are stored in the EEPROM 40.

Electric Meter Monitoring

The interface board 18 has two major functions. The first is to obtain load profile data periodically from the meter board 12 and transmit that data to a host computer 28 via the pager board 24 and the pager network 26. The second major function of the interface board 18 is to monitor power quality data available from the meter board 12. The meter board 12 provides the three phase voltages and phase angles of the current passing through the mete. The host computer 28 is notified whenever a reportable power quality event as defined below occurs. A primary characteristic of power quality events is that they cannot be reported at scheduled times as can load profiles. Hence other non-scheduled alarm conditions that the interface board 18 may be configured to monitor, such as demand threshold reporting, are described below together with power quality event reporting.

The power quality events monitored and reported by the exemplary interface board 18 are (1) power outage events, (2) high/low voltage events, (3) voltage unbalance events, and (4) momentary interruption/voltage sag events, which are defined as follows:

(1) A power outage event occurs when a phase voltage has dropped to less than a pre-selected percentage (e.g., 50%) of nominal phase voltage for a pre-selected interval of time. For example, an interval in the range of 1 to 10 minutes may be pre-selected for the exemplary interface board 18.

(2) A high/low voltage event occurs when a phase voltage has deviated from nominal phase voltage by a pre-selected percentage for a pre-selected interval of time. For example, a percentage in the range from 5 to 20 percent and an interval in the range of 1 to 30 minutes may be pre-selected for the exemplary interface board 18.

(3) A voltage unbalance event occurs when a phase-to-phase voltage has deviated from the average of the three phase-to-phase voltages by a pre-selected percentage for a pre-selected interval of time. For example, a percentage in the range from 2 to 6 percent and an interval in the range of 15 to 30 minutes may be pre-selected for the exemplary interface board 18.

(4) A reportable momentary interruption/voltage sag ("MIVS") event occurs when an average phase voltage has dropped below the nominal phase voltage a pre-selected number of times within a predefined window of time by more than a pre-selected percentage. For example, a percentage of 20 percent or more, a number of times in the range of 1 to 10, and a window of time in the range of 1 to 60 minutes may be pre-selected for the exemplary interface board 18. Each voltage drop is referred to herein as a MIVS event; if a sufficient number of MIVS events are recorded, then a MIVS report is made by the interface board 18. Because the monitoring MIVS events is more complex than the monitoring of the other events, it is described in detail below.

The meter board 12 calculates average phase voltages, currents, and angles and updates such data every 300 milliseconds in a register that is accessible via the serial port 16. During an update the data in the register may be incorrect. To use such data for monitoring power quality, the interface board 18 could read the stored phase voltages every 300 milliseconds if its clock were synchronized with the meter board 12 so that the readings would always take place between updates to the stored data. The inventors have found, however, that it is preferable to take not attempt to synchronize with the meter board 12 and instead to poll the meter serial port 16 every 100 milliseconds for the necessary data. By taking more readings than necessary the interface board 18 can weed out any readings that might be taken during the period the phase voltages are being updated (and which therefore may be incorrect) or that might be taken when the meter board is too busy to respond, but still be able to capture the necessary data in most cases. While the meter board 12 raises a flag during its updating process to signify that data read from the serial port 16 may be incorrect, the inventors have found that bad readings can occur even if the flag is not set. Also, it has been found that under certain circumstances (when the meter board 12 has been polled too soon after powering up), the voltage data may be incorrect (zero or very small). A filter can be used to cause such readings to be ignored or they may be allowed treated as MIVS events so that the malfunctioning of the meter board 12 can be monitored. In any case readings taken while the updating flag is set can be ignored.

An alternative to obtaining data from the meter board serial port 16 may be to connect directly to the data/address bus of the meter board 12 and listen for data being stored.

Assuming that good data has been obtained from the serial port 16 (because it has been read when the meter board 12 is not updating the data and no other problems are causing bad data to be read), the average phase voltages will be read every 100 ms. However, because the underlying data stored in the meter board 12 changes every 300 ms, the voltage for a particular phase will consist of consecutive groups of three identical readings. The interface board 18 treats each phase voltage reading as if it were an independent average for 100 ms of the phase voltage. The consequences of this treatment are that (1) a momentary interruption cannot be distinguished from a voltage sag and (2) at a given threshold reduction in average phase voltage, some momentary interruptions or sags may not be detectable.

For example, if the average phase voltage on one phase drops by 20% (to 96 volts if the nominal voltage is 120 volts) for three consecutive 100 ms average phase voltage readings (we are assuming that all readings are good data, so there will be three identical readings), then there could have been an interruption (zero volts, say) for 50 ms and full nominal voltage of 120 volts for 250 ms. On the other hand, there could have been a voltage sag to 96 volts for the entire 300 ms or a deeper sag for a portion of the 300 ms and nominal voltage for the remainder of the 300 ms. If the threshold for reporting is set at 96 volts, then no momentary interruption of less than 50 ms within the 300 ms period can be detected. Hence a phase voltage reading of 96 volts can mean anything from an interruption of 50 ms to a sag to 96 volts for 300 ms. Also, an interruption or sag can cross a boundary between 300 ms periods. To detect an interruption that straddles the boundary, the interruption would have to last for at least 50 ms in one of the two 300 ms periods. In the case of voltage sags, a voltage sag to 96 volts that began in one 300 ms period would have to continue through the entire succeeding 300 ms period or no MIVS event would be detected by the interface board 18 if the threshold for MIVS events were set at 96 volts.

A MIVS event is considered to continue until a reading of the relevant average phase voltage is not longer less than the nominal voltage by the predefined percentage.

One option for dealing with bad data is to require that there be two consecutive average voltage readings that are both less than the nominal voltage by the predefined percentage before a MIVS event is treated as having begun. This criterion could be strengthened even further by requiring that three consecutive average voltage readings all be less than the nominal voltage by the predefined percentage before a MIVS event is treated as having begun. However, in some situations that would mean that an isolated MIVS event would be missed if a reading were ignored because the data was being updated.

In the past monitoring of power quality events has been done by large dedicated instruments, not as an adjunct to a power usage measurement in a conventional commercial and industrial meter such as the Siemens S4. The interface board 18 provides a means for inexpensively turning a meter such as the Siemens S4 into a power-quality monitoring device. While many of the features of the interface board described below make it most useful when coupled with a two-way pager, the interface board can also be used to advantage if it is connected by a land telephone line or a hardwired network connect to a host computer 28. Those skilled in the art will understand that connections such as RS-485, CDPD modem, or telephone modem may also be used.

The host computer is not described in detail here. However, an important feature of the interface board 18 is that it provides for reporting of power quality events such that the host computer may notify the electricity supplier or its customer of power quality events in near real-time. Means such as fax, email, the Internet, telephone, or personal messaging devices such as pagers and web or email-enabled cellular telephones may be used by the host computer 28 to provide nearly immediate notification of power quality events.

All power quality events are logged in a circular buffer. The interface board accepts commands from the host to send out the contents or part of the contents of the buffer via the pager so as to provide data for later diagnosing of problems in the meter.

The fundamental elements of the power quality aspect of the interface board 18 are that it is interrupt driven, uses an ad hoc (circular) buffer to record power quality events that may be reported, is remotely configurable, tracks network time, and uses average phase voltages to determine when a MIVS event has occurred.

The interface board 18 may be reset from the remote host so that the interface board 18 provides load profile data, but not power quality data, to the host 28 via the pager board 254 and pager system 26. This capability makes possible the granting of "migrating licenses" to use the power quality features of fewer than all of the meters installed and licensed for current usage data collection. The utility whose power sales are being metered may wish to collect power quality data only from a small number of meters, but have the capability of re-designating on its own volition which meters collect power quality data.

The interface board 18 also provides running mean power consumption tracking for up to four daily periods and notifies the host 28 if the specified threshold levels are exceeded during those periods. This is treated a power quality event, so that the host 28 is notified in near-real time when the running average exceeds the threshold.

Security (a required password) is provided to prevent unauthorized access to the hardware and firmware. This security is in addition to the meter's own security system.

Encryption is also provided using industry standard methods. The usage and power quality data, key management, and the power quality license data are encrypted separately.

The interface board 18 also provides a report flag that allows all or some power quality reporting functions to be turned off to be set and reset from the host. The interface board 18 can also be configured from the host 28 to change the definition of a reportable power quality event. For example, the utility may only want to have a report if five MIVS events occur within five minutes.

Further, the interface board 18 also provides for the option of reporting together with a reportable power quality event any partially collected data regarding a condition that would trigger a report of a power quality event if the condition being monitored were to continue. For example, if a high voltage condition were to continue long enough to trigger a report of it as a power quality event, then in the same report to the host, the firmware can be set to also include data being collected on MIVS events for which the defined time interval has not yet elapsed. This capability allows airtime on the pager system 26 to be minimized and the cost of operation of power quality monitoring to 20 reduced.

The interface board 18 also provides for remote selection of the use of compression, binary, or ASCII data formats for transmitting data to the host 28.

The power supply/charger board 30 is needed to use the interface board 18 in an S4 meter application because the power supply available from the S4 meter board 12 does not have sufficient capacity to power the interface board 18 and the pager board 24 during a transmission. In particular, the pager board 24 requires a large amount of electrical power when it is transmitting. For example, every one second of transmission by the pager board 24 requires approximately 30 seconds of charging assuming that 50 mA of charging current is available from the meter board 12. Also, because the S4 meter is powered from phase C of the current being metered, for the interface board 18 is to continue operating (e.g., providing power outage and restoration notification) during a power failure, it is necessary for the interface board 18 to have backup battery power.

Software

A basic function of the interface board 18 is to provide daily load profiles to the host computer 28 for billing purposes. The readings taken for this purpose are scheduled. In order to reduce the cost of airtime, load profile data is compressed in the manner described below before being sent.

Raw load profile data is read from meter serial port 16 via interface serial port 20 and stored in an input buffer by the microprocessor 32. The raw data is a series of 16-bit words, each of which may be either a data value providing the power consumption for a defined interval (typically 15 minutes) or a time/date stamp. In a typical embodiment, the input buffer stores 96 words of data and one time/date stamp. If the high order bit of a raw data word is a 1, then the word is a time/date stamp. The second highest order bit is a parity bit, leaving 14 data bits for a load profile data value. Hence load profile data values can be in the range 0 to 16383.

In general, a differential compression method in accordance with the present compresses data values by transmitting only the differences between successive data values, so long as the differences can be represented by an 8-bit byte. Note that in the following discussion a two's-complement representation of negative numbers is used.

In the first embodiment of the differential compression in the present invention, compression may turned on and off as the stream of raw data words are read from the input buffer by examining the data value of the current word to determine whether the difference between it and the data value of the last data word read can be represented by a single byte. A indicator in the form of a special byte value may be sent to indicate to the host computer 28 signifying that compression is turned on for succeeding bytes until turned off. If compression is on, then to indicate that compression will be off for successive data, a special byte value is used. Since one byte is used to indicate compression will be turned off, the other byte indicates a difference value. This can represent 255 possible values (0x00 to 0xFF provides 256 possible differences) since one value (−128) is reserved to indicate that compression is turned off. Thus, differences of −127 to +127 can be indicated. When uncompressed values are being sent and a value is encountered that could be sent as a difference from the last value, then a special byte such as 0xFF may be sent as the high byte of the word to indicate that compression is to be on and the low byte should be treated as a difference value. Note that the special byte value indicating that compression is on for succeeding bytes may be the same as the byte value sent while compression is on. Hence 0xFF when compression is on means a difference of negative 1, whereas when compression is off, 0xFF means that the next byte is a difference value and that compression is on for succeeding bytes.

The differential compression scheme described above may be modified by looking ahead in the input buffer before turning compression off to determine whether the next data word read could be compressed if the current word were sent uncompressed. For example, if compression is on and a data word having a value of 300 is read and the previous data work had a value of 100, then the difference of +200 would be too large to represent in one byte and under the scheme described above, a special byte value of −128 would be sent to turn compression off, followed by the value 300 as a two-byte word. However, suppose the value of the next data word following 300 is 301. In that case, the scheme would send a byte value 0xFF to indicate compression is on and then +1 as a byte value. The total cost in bytes to send the two readings would be five bytes. If the byte value of the next word were scanned before sending the compression-off byte value, then a second special value indicating that compression is off only for the next word could be sent instead of the compression-off byte value. The byte cost would then be reduced by one as the 301 value could be sent as a difference without prefacing it by the compression-on byte.

The differential compression scheme as previously described above may be further modified to handle data that varies slowly over a range that is somewhat larger than can be handled with difference encoded in single bytes. To do so, further special bytes are sent while compression is on to indicate that the magnitude of the difference byte should be increased. For example, if the difference value is only slightly outside the range of possible differences, say +130, then a special byte value may be sent before a difference value of +5, indicating that 125 is to be added to the value 5 and the sign of the difference is +. It should be noted that this scheme reduces the number of difference values that can be sent in a byte as some of the possible values are taken as special values. In the embodiment scheme illustrated in FIG. 6, the special byte values 126, 127, and 128 indicate adding 125, 252, and 379 to the next byte, respectively. The special byte values −127 turns compression off and the special byte value −126 indicates that compression is to be on, except for the next two bytes, which are to be taken as a 16-bit word.

Figure 3:
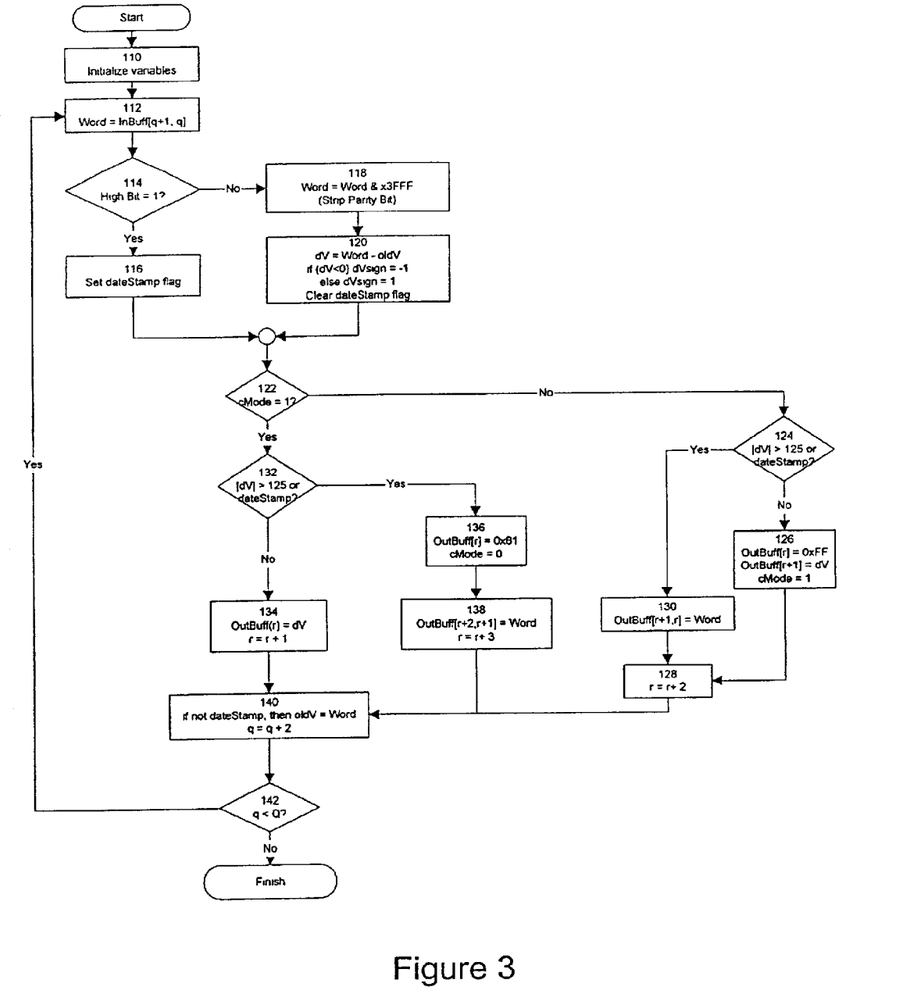
FIG. 3 is a flowchart showing a differential compression process in accordance with an embodiment of the present invention for use in transmission of load profile data by the system shown in FIG. 1.
Figure 4:
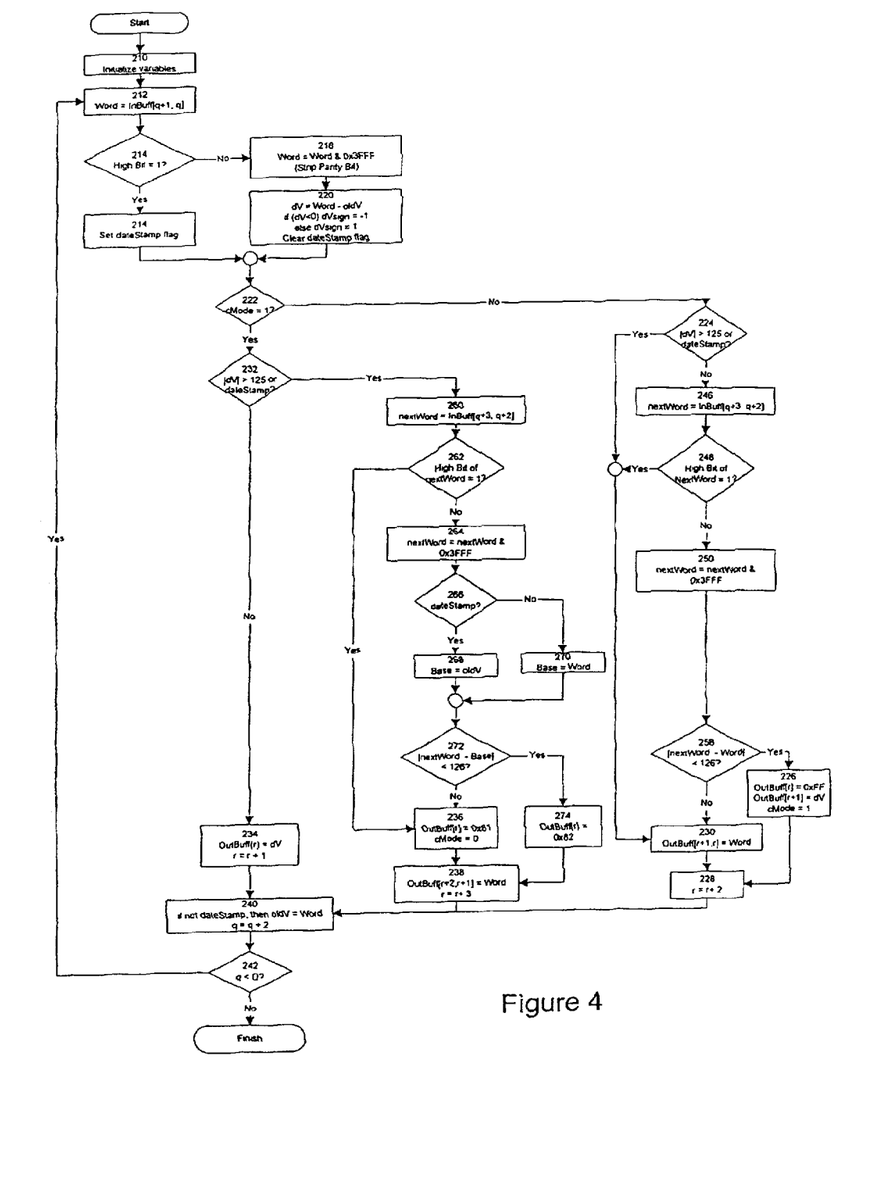
FIG. 4 is a flowchart showing an alternative embodiment of the simplified differential compression process of the present invention.
Figure 5:
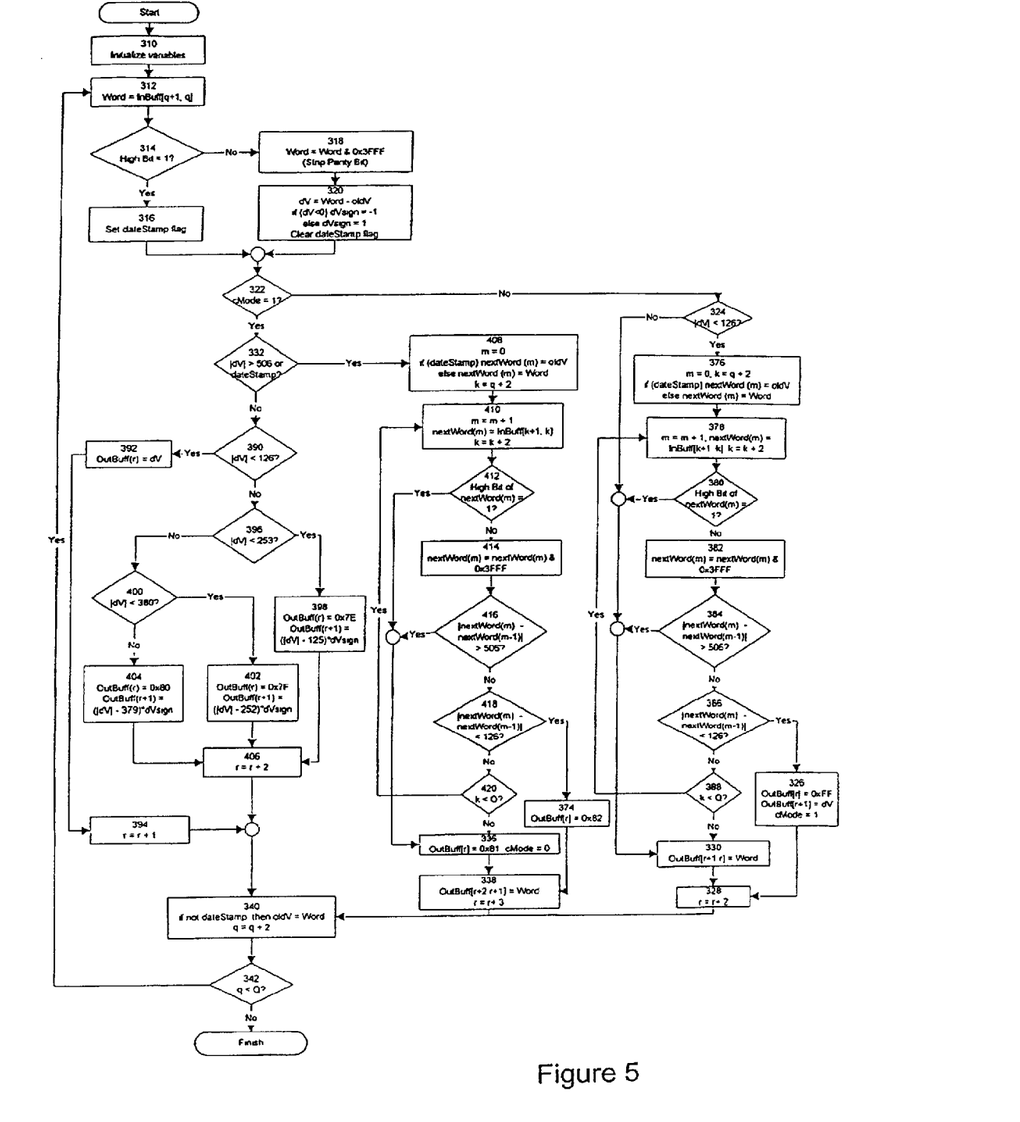
FIG. 5 is a flowchart showing yet another alternative embodiment of the differential compression process of the present invention.

Flowcharts describing the embodiments of the differential compression processes of the present invention in more detail are shown in FIGS. 3, 4, and 5, respectively. The following variables are used:

InBuff input buffer
    OutBuff output buffer
    q InBuff pointer (initialized to 0)
    Q total number of bytes in InBuff
    r OutBuff pointer (initialized to 0)
    cMode compression mode flag, a value of 1 means compression is "on" and 0 means compression is "off" (initialized to 0)
    Word current word read from InBuff
    nextWord the word after the current word in InBuff
    oldV previous value of Word (initialized to 0)
    Base either oldV (if Word is a date/time stamp) or Word (if Word is not a date/time stamp)
    dV (Word−oldV)
    dVsign sign of dV
    dateStamp flag indicating that the current Word is a date/time stamp The first embodiment of the differential compression process described in FIG. 3 begins with initialization of the variables as discussed above (block 110). The first word in the input buffer InBuff is then read (block 112) and its high order bit tested (block 114). If the high order bit is 1, the word is a date/time stamp, so the dateStamp flag is set (block 116). Otherwise, the word is taken to be one measurement of load profile data, which includes a 14-bit data value preceded by a parity bit. Hence the parity bit must stripped off by AND-ing the word with 0x3FFF (block 118). In block 120, a difference value dV is determined by subtracting the previous value of the word oldV from the word just read and the sign dVsign of the difference value dV is determined. As the previous value was initialized to zero, the first difference value will be equal to the first word read that is not a date/time stamp.

The process then continues by checking (block 122) to determine whether compression is on. If compression is not on, the absolute value of dV and the dateStamp flag are checked (block 124) to determine whether the absolute value of dV is greater than 125 or if the dateStamp flag is set. If neither is true, then Word must be a data value that differs from its previous value by less than 126 and the operations of block 126 are performed, namely, a word having 0xFF as the high order byte and dV as the low order byte is written to the output buffer, the high order byte signifying that compression is on and the low order byte representing the first difference value, and the flag cMode indicating whether compression is on or off is set to value 1. The output buffer pointer is then incremented (block 128) by 2. If compression is not on and the absolute value of the dV is greater than 126 or dateStamp flag is set, then Word is written (block 130) to the output buffer and the output buffer pointer r is incremented 128 by 2.

In the embodiment of the differential compression process shown in FIG. 3, difference values may range from −125 to +125, the special byte value −127 (0x81 in hexadecimal) being reserved to act as a flag that compression is to be off for successive transmissions. This scheme only uses 252 (251 difference values, including 0, plus one flag) of the 256 possible values that could be represented in one 8-bit byte in order to be consistent with the choice of special bytes used in the schemes presented in FIGS. 4 and 5. Clearly, the difference values in the range −127 to +127 could be represented if only one byte (say 128) is used as a flag.

On the other hand, if compression was on at the decision point indicated by block 122, then the absolute value of dV and the dateStamp flag are checked (block 132) to determine whether the absolute value of dV is greater than 125 or if the dateStamp flag is 15 set. If neither is true, then Word must differ from its previous value by less than 126 and compression may remain on. In that case, the operations of block 134 are performed, namely, difference value dV is written to the output buffer and the output buffer pointer r is incremented by 1. If either the absolute value of dV is greater than 125 or the dateStamp flag is set, then compression will have to be turned off as in the scheme shown in FIG. 3 cannot handle difference values greater than 125 or two-byte time/date stamps. In that case, the operations of block 136 are performed, namely, special byte 0x81 (decimal 128) is written to the output buffer and the compression flag cMode is cleared (set to value 0) and the operations of block 138 are performed, namely, the current Word, which must be either a data value with the parity bit stripped off or a date/time stamp, is written to the output buffer and the output buffer pointer r is incremented by 3 (one position for the special byte and two for the current Word.

After the output buffer pointer r is incremented in each of the situations above, the operations of block 140 are performed, namely, if the current Word is not a date/time stamp, then the variable oldV holding the previous value of the current Word is set to the value of the current Word and the input buffer point q is incremented by 2.

The input buffer point q is then tested (block 142) against the total number of bytes Q in the input buffer to determine whether the input buffer has been completely read. If it has the process is complete. If not, another word is read (block 112) and processed as above until at block 142 it is determined that the input buffer has been completely read.

The embodiment described above in relation to FIG. 3 does not anticipate two situations that reduce its usefulness in the compression of load profile data in the interface board 18. The first, is that it may send more data than if compression were not used at all. For example, suppose a sequence of load profile readings differed from each other by differences that alternated between values less than 126 and greater than 126. Compression would be turned alternately on and off repeatedly until the sequence ended. Each time compression is turned off an extra byte is used so that for every pair of data values in the sequence, five bytes are sent, rather than the four bytes sent if compression were never used. In fact, even an isolated large difference preceded and followed by a series of small differences cause one extra byte to be sent.

FIG. 4 illustrates an embodiment of the differential compression process which modifies the embodiment described above that handles the first situtation by scanning ahead in the input buffer to determine whether anything can be gained by delaying going in or out of compression. For example, if compression is already on and the current Word in the input buffer represents a large difference from the previous Word value, but the next Word value in the input buffer represents a small difference from the current Word, then using a byte to turn compression off and then a byte to turn it on again means that five bytes have been sent to represent two two-byte data words. If on the other hand a special byte (0x82 in FIG. 4) is sent to indicate that compression is only to off for the current Word, then the total number of bytes needed is four. Similarly, if compression is off and the current Word in the input buffer represents a small difference from the previous Word value, compression may be left off if the next Word value in the buffer represents a large change from the current Word value. In either case, the compressed result can be no longer than no compression at all and will be shorter if the input buffer contains sequences of Word values that differ by small differences. In this discussion, "small differences" means differences of less than 126 in absolute value.

The embodiment of the differential compression process described in FIG. 4 begins with initialization of the variables as discussed above (block 210). The first word in the input buffer InBuff is then read (block 212) and its high order bit tested (block 214). If the high order bit is 1, the word is a date/time stamp, so the dateStamp flag is set (block 216). Otherwise, the word is taken to be one measurement of load profile data, which includes a 14-bit data value preceded by a parity bit. Hence the parity bit must stripped off by AND-ing the word with 0x3FFF as indicated in block 218. As indicated by block 220, a difference value dV is then determined by subtracting the previous value of the Word oldV from the word just read and the sign dVsign of the difference value dV determined. As the previous value was initialized to zero, the first difference value will be equal to the first word read that is not a date/time stamp.

The process then continues by checking (block 222) to determine whether compression is on. If compression is not on, then the absolute value of dV and the dateStamp flag are checked (block 224) to determine whether the absolute value of dV is greater than 125 or if the dateStamp flag is set. If either is true, then the current Word is written (block 230) to the output buffer and the output buffer pointer r is incremented by 2 (block 228).

If compression is not on and the absolute value of dV is not greater than 125 and the dateStamp flag is not set, then the next word in the input buffer is read (block 246) into nextWord and checked (block 248) to determine if it is a date/time stamp. If nextWord is a date/time stamp, then the current Word, which is a data value, is written (block 230) to the output buffer and the output buffer pointer r is incremented by 2 (block 228). If nextWord is not a date/time stamp, then the parity bit is stripped off (block 250) and the absolute value of the difference between nextWord and the current Word checked (block 258). If the absolute value of that difference is less than 126, then the operations of block 226 are performed, namely, a word having 0xFF as the high order byte and dV as the low order byte is written to the output buffer, the high order byte signifying that compression is on and the low order byte representing the first difference value, and the flag cMode is set to value 1 indicating that compression is on. The output buffer pointer r is then incremented by 2 (block 228). On the other hand, if the absolute value of the difference checked at block 258 is not less than 126, then the current Word, which is a data value, is written (block 230) to the output buffer and the output buffer pointer r is incremented by 2 (block 228).

On the other hand, if compression was on at the decision point indicated by block 222, then the absolute value of dV and the dateStamp flag are checked (block 232) to determine whether the absolute value of dV is greater than 125 or if the dateStamp flag is set. If neither is true, then Word must differ from its previous value by less than 126 and compression may remain on. In that case, the operations indicated in block 234 are performed, namely, difference value dV is written to the output buffer and the output buffer pointer r is incremented by 1.

If either the absolute value of dV is greater than 125 or the dateStamp flag is set, then the next word in the input buffer is read (block 260) into nextWord and nextWord is checked (block 262) to determine if it is a date/time stamp. If nextWord is a date/time stamp, then the operations indicated in block 236 are performed, namely, special byte 0x81 (decimal 128) is written to the output buffer and the compression flag cMode is cleared (set to value 0). Then the operations indicated in block 238 are performed, namely, the current Word, which must be either a data value with the parity bit stripped off or a date/time stamp, is written to the output buffer and the output buffer pointer r is incremented by 3 (one position for the special byte and two for the current Word).

If nextWord is not a date/time stamp, then the parity bit is stripped off (block 264). If the current word is a date/time stamp, then nextWord should be compared to the last data value of Word, oldV. Otherwise, nextWord should be compared to the current value of Word. To do this the current value of the dateStamp flag is checked (block 266) and the variable Base is set to the value of oldV if dateStamp is set (block 268) or to the value of Word if dateStamp is not set (block 270). Then the absolute value of the difference between nextWord and Base may be checked (block 272). If the absolute value of the difference is less than 126, then special byte 0x82 (decimal −126) is written (block 274) to the output buffer and operations indicated in block 238 are performed, namely, the current Word, which must be either a data value with the parity bit stripped off or a date/time stamp, is written to the output buffer and the output buffer pointer r is incremented by 3 (one position for the special byte and two for the current Word.

On the other hand, if the absolute value of the difference checked at block 272 is not less than 126, then the operations indicated in block 236 are performed, namely, special byte 0x81 (decimal −127) is written to the output buffer and the compression flag cMode is cleared (set to value 0). The operations indicated in block 238 are performed, namely, the current Word, which must be either a data value with the parity bit stripped off or a date/time stamp, is written to the output buffer and the output buffer pointer r is incremented by 3 (one position for the special byte and two for the current Word).

After the output buffer pointer r is incremented in each of the situations above, the operations indicated in block 240 are performed, namely, if the current Word is not a date/time stamp, then the variable oldV holding the previous value of the current Word is set to the value of the current Word and the input buffer point q is incremented by 2.

The input buffer point q is then tested (block 242) against the total number of bytes Q in the input buffer to determine whether the input buffer has been completely read. If it has the process is complete. If not, another word is read (block 212) and processed as above until at block 242 it is determined that the input buffer has been completely read.

The differential compression process illustrated in FIG. 4 can be further modified inot a third embodiment of the present invention by the use range-expansion byte values 126, 127, and −128 to indicate that the next difference value is to be increased in absolute value by 125, 252, or 379, respectively. If that modification is added, then the scan-ahead modification discussed above in relation to FIG. 5 should be expanded to scanning ahead past any Words that could be represented by one of the range-expansion byte values 126, 127, or −128 and a difference value to the first Word in the rest of input buffer that is either a data value that can be represented as a single-byte difference without a range-expansion byte, a data value that cannot be represented as a single-byte difference even with a range-expansion byte, or a time/date stamp. In effect, since data values represented by a range-expansion byte and a difference byte require a two-byte word to transmit, they should be ignored for the purpose of scanning ahead. If the expansion of the scan-ahead process is not added, then under some circumstances an extra byte is used because compression may be started and stopped without actually sending a data value as a single byte. For example, a large difference might be followed by several differences that can be represented by a range-expansion byte with a difference byte (a "medium difference"), another large difference, and finally a medium difference. Going into compression and then out again, as would occur if the process described in relation to FIG. 4 were used, would take one extra byte beyond not using compression at all.

FIG. 5 illustrates an embodiment of the differential compression scheme of the present invention incorporating the range-expansion bytes and the expanded scanning-ahead modification. It begins with initialization of the variables as discussed above (block 310). The first word in the input buffer InBuff is then read (block 312) and its high order bit tested (block 314). If the high order bit is 1, the word is a date/time stamp, so the dateStamp flag is set (block 316). Otherwise, the word is taken to be one measurement of load profile data, which includes a 14-bit data value preceded by a parity bit. Hence the parity bit must stripped off by AND-ing the word with 0x3FFF as indicated in block 318. As indicated in block 320, a difference value dV is then determined by subtracting the previous value of the Word oldV from the word just read and the sign dVsign of the difference value dV determined. As the previous value was initialized to zero, the first difference value will be equal to the first word read that is not a date/time stamp.

The process then continues by checking (block 322) to determine whether compression is on. If compression is not on, then the absolute value of dV is checked (block 324) to determine whether the absolute value of dV is less than 126. If it is not, then the current Word is written (block 330) to the output buffer and the output buffer pointer r is incremented by 2 (block 328).

If compression is not on and the absolute value of dV is less than 126, then the operations indicated in block 376 are performed, namely, an index m is initialized to 0, and nextWord(m) is initialized to the previous value of Word, if the current Word is a time/date stamp, or to the current value of Word, if Word is a data value, and an index k to the input buffer is initialized to point to the first byte of next Word following the current Word in the input buffer.

Following the initialization (block 376), a loop is run in which the operations indicated in block 378 are performed, namely, m is incremented by 1, nextWord (m) is set to the next word in the input buffer InBuff(k+1,k), and then k is increment by 2. The high order bit of nextWord(m) is then tested (block 380) to determine if nextWord(m) is a time/date stamp. If it is, then the current Word is written (block 330) to the output buffer and the output buffer pointer r is incremented by 2 (block 328). If it is not, then nextWord(m) must be a data value, so the parity bit is stripped-off (block 382) and the absolute value of the difference between nextWord(m) and nextWord(m−1) is checked (block 384) to determine if it is greater than the largest difference that can be represented with the range-expansion bytes (506). If it is, then the current Word is written (block 330) to the output buffer and the output buffer pointer r is incremented by 2 (block 328). If it is not, a further check (block 386) is made to determine whether the absolute value of the difference is less than 126. If it is, then the operations indicated in block 326 are performed, namely, a word having 0xFF as the high order byte and dV as the low order byte is written to the output buffer, the high order byte signifying that compression is on and the low order byte representing the first difference value, and the flag cMode is set to value 1 indicating that compression is on. The output buffer pointer r is then incremented by 2 (block 328). On the other hand, if the absolute value of the difference checked at block 386 is not less than 126, then by testing (block 388) the index k control loops back to the operations indicated by block 378 if all of the words in the input buffer have not already been tested or otherwise the current Word is written (block 330) to the output buffer and the output buffer pointer r is incremented by 2 (block 328).

On the other hand, if compression was on at the decision point indicated by block 322, then the absolute value of dV and the dateStamp flag are checked (block 332) to determine whether the absolute value of dV is greater than 506 or if the dateStamp flag is set. If neither is true, then the absolute value of dV is tested (block 390) to determine if it is less than 126. If it is, then difference value dV is written (block 392) to the output buffer and the output buffer pointer r is incremented by 1 (block 394).

If absolute value of dV is tested 390 to be not less than 126, then absolute value of dV is tested (block 396) to determine if it is less than 253. If it is, then a word having as a high order byte the value 0x7E and as a low order byte a value having an absolute value of dV less 125 and the same sign as dV is written (block 398) to the output buffer and the output buffer pointer r incremented by 2 (block 406).

If absolute value of dV as tested at block 396 is not less than 253, then it is further tested at block 400 to determine if it is less than 380. If it is less than 380, then a word having as a high order byte the value 0x7F and as a low order byte a value having an absolute value of dV less 252 and the same sign as dV is written (block 402) to the output buffer and the output buffer pointer r incremented by 2 (block 406). If it is not less than 380, then a word having as a high order byte the value 0x80 and as a low order byte a value having an absolute value of dV less 379 and the same sign as dV is written (block 404) to the output buffer and the output buffer pointer r incremented by 2 (block 406).

If compression the absolute value of dV was greater than 506 or if the dateStamp flag was on at the decision point indicated by block 332, then the operations indicated by block 408 are performed, namely, an index m is initialized to 0, and nextWord(m) is initialized to the previous value of Word, if the current Word is a time/date stamp, or to the current value of Word, if Word is a data value, and an index k to the input buffer is initialized to point to the first byte of next Word following the current Word in the input buffer.

Following the initialization block 408, a loop is run in which the operations indicated by block 410 are performed, namely, m is incremented by 1, nextWord (m) is set to the next word in the input buffer InBuff(k+1,k), and then k is increment by 2. The high order bit of nextWord(m) is then tested (block 412) to determine if nextWord(m) is a time/date stamp. If it is, then the current Word is written (block 336) to the output buffer and the output buffer pointer r is incremented by 2 (block 338). If it is not, then nextWord(m) must be a data value, so the parity bit is stripped-off (block 414) and the absolute value of the difference between nextWord(m) and nextWord(m−1) is checked (block 416) to determine if it is greater than 506, the largest difference that can be represented with the range-expansion bytes. If it is, then the current Word is written (block 336) to the output buffer and the output buffer pointer r is incremented by 2 (block 338). If it is not, a further check (block 418) is made to determine whether the absolute value of the difference is less than 126. If it is, then a byte having the value 0x82 is written (block 374) to the output buffer to indicate that the next word written to the output buffer is not compressed, but that compression should stay on. The operations indicated by block 338 are then performed, namely, the current Word is written to the output buffer and the output buffer pointer r is incremented by 3 (one position for the special byte and two for the current Word).

On the other hand, if the absolute value of the difference checked at block 418 is not less than 126, then the index k is tested (block 420) and control loops back to the operations indicated by block 410 if all of the words in the input buffer have not already been tested or otherwise the operations indicated by block 336 are then performed, namely, special byte 0x81 (decimal −127) is written to the output buffer and the compression flag cMode is cleared (set to value 0). The operations indicated by block 338 are performed, namely, the current Word is written to the output buffer and the output buffer pointer r is incremented by 3 (one position for the special byte and two for the current Word).

After the output buffer pointer r is incremented in each of the situations above, the operations indicated by block 340 are performed, namely, if the current Word is not a date/time stamp, then the variable oldV holding the previous value of the current Word is set to the value of the current Word and the input buffer point q is incremented by 2.

The input buffer point q is then tested (block 342) against the total number of bytes Q in the input buffer to determine whether the input buffer has been completely read. If it has the process is complete. If not, another word is read (block-312) and processed as above until at block 342 it is determined that the input buffer has been completely read.

The differential compression scheme described in FIG. 5 has an advantage over other more complex compression schemes in that the required memory and computational power is quite low. For example, because the process proceeds sequentially through the input buffer, the output buffer may occupy the same memory positions as the input buffer. A major design goal has been to eliminate the possibility that more bytes could be written to the output buffer than have been read from the input buffer, even if the data were extremely perverse. An example of perverse data would be if large differences between data values alternated with same differences throughout the data. The embodiment shown in FIG. 4 and the embodiment scheme shown in FIG. 5 would under such circumstances simply not compress the data at all. The embodiment of FIG. 3 would, however, compress every other value, resulting in an output buffer about 20% than the input buffer.

Those skilled in the art will recognize the detailed flowcharts presented in FIGS. 3, 4, and 5 merely illustrate but one possible representation of the invention. For example, those skilled in the art will recognize that the operations indicated by blocks 408–420 could be embodied in a single procedure that could also be used to perform the operations indicated by blocks 376–388 and doing so would be within the skill expected of those skilled in the art. Those sets of operations have been shown separately in FIG. 5 to aid in the explanation of the overall compression.

In addition, the use of three as the number of range-expansion bytes is arbitrary. Clearly, depending upon the characteristics of the data to be compressed, more or fewer range-expansion bytes may be used. In fact, the number of range-expansion bytes could be varied dynamically by scanning the input buffer before commencing the compression process.

In a typical situation, the input buffer hold 96 words of load profile data and one time/date stamp. (There maybe more than one time/date stamp if the real time clock has been reset during the last day.) In one typical situation in which a compression scheme of the form shown in FIG. 5 was used, there were four words of data that required range-expansion bytes and one word of data that could not be compressed. The balance of the data words were compressed without using range-expansion bytes. The result was that 104 bytes were needed to send the 97 two-byte words, a compression of almost 50% using a fast routine that needs only a single input/output buffer.

In the current embodiment of the interface board 18, it is possible that more than one channel of data may be stored alternating word-by-word in the input buffer. In that case, the compression process treats each channel completely separately from the other. Furthermore, the above described compression scheme can be used to send data for not only electric energy meters, but any type of utility meter, including, but not limited to, water meters and natural gas meters. The system can be used not only for sending utility meter readings, but any type of limited data obtained from remote devices or appliances. For example, the information regarding the status and condition of a vending machine could be remotely read, avoiding the need for periodic inspections of the inventory status. Dropboxes, such as parcel depository boxes could be equipped with sensors that monitor the dropbox for the presence of a parcel and report to a host computer the change in status. Alarm systems and other monitoring systems could also utlize the system to send periodic and nonperiodic data readings.

That which is claimed:

1. A method of wirelessly transmitting periodic readings of a remote utility meter to a host computer, comprising:
   (a) storing a plurality of meter reading values in a buffer;
   (b) processing said plurality of meter reading value in said buffer to determine the relative difference between a first meter reading value and a second meter reading value wherein said second meter reading value is the next sequentially stored meter reading value in said buffer relative to said first meter reading value;
   (c) determining whether said relative difference is less than a predetermined value;
   (d) determining the status of a compression flag,
   (e) if said relative difference is less than said predetermined value and said compression flag is not set, then setting said compression flag, transmitting a compression indication, and transmitting said relative difference;
   (f) if said relative difference is less than said predetermined value and said compression flag is set, then transmitting said relative difference;
   (g) if said relative difference is greater than said predetermined value, and said compression flag is not set, then transmitting said first meter reading value; and
   (h) if said relative difference is greater than said predetermined value, and said compression flag is set, then resetting said compression flag, transmitting a decompression indication and transmitting said first meter reading value.

2. The method of claim 1, wherein said relative difference is represented using one byte, said compression indication is represented using one byte, said decompression indication is represented using one byte, and said meter reading data is represented using two bytes.

3. The method of claim 1 wherein steps (b)–(h) are repeated for said plurality of meter reading values contained in said buffer.

4. The method of claim 1 wherein step (e) includes transmitting a compression indication selected from a group comprising an unlimited duration compression indication and an limited duration compression indication.

5. The method of claim 4 wherein the limited duration compression indication is selected when a third meter reading value in said buffer is examined and a second relative difference between said third meter reading value and said second meter reading value is determined, and said second relative difference is less than said predetermined amount.

6. The method of claim 1 wherein step (c) further determines whether said relative difference is less than a second predetermined value, a third predetermined value, and a forth predetermined value, and transmitting a corresponding difference magnitude indication with said compression indication.

7. A method of receiving meter reading data by a host computer transmitted from a meter, comprising:

(a) initializing values in a receiving buffer;

(b) receiving a plurality of data bytes into said buffer;

(c) reading a first data byte stored in said buffer;

(d) determining whether said first data byte includes a compression indication or decompression indication;

(e) if said first data byte does not include said compression indication and does not include said decompression indication, then reading a second byte stored in said buffer and determining a first meter reading value using said first data byte and said second data byte;

(f) if said first data word includes said compression indication, then reading said second data byte stored in said buffer and determining a first meter reading value by using said second data byte and to a previously stored meter reading value; and (g) if said first data includes said decompression indication, then reading said second data byte and a third data byte stored in said buffer and determining a first meter reading value by using said second data byte and said third data byte;

(h) equating a previously stored meter reading value to said first meter reading value.

8. The system of claim 7 wherein steps (c)–(h) are repeated.

* * * * *